Feb. 24, 1925.　　　　　　　　　　　　　　　　　　　1,527,292
J. BARLOW
HEATER
Filed Oct. 23, 1922　　　　2 Sheets-Sheet 1

Witnesses:

Inventor:
Jerome Barlow
By Joshua R H Potts
His Attorney

Feb. 24, 1925.

J. BARLOW

HEATER

Filed Oct. 23, 1922        2 Sheets-Sheet 2

1,527,292

Witnesses:

Inventor:
Jerome Barlow
By Joshua R H Potts
His Attorney

Patented Feb. 24, 1925.

1,527,292

UNITED STATES PATENT OFFICE.

JEROME BARLOW, OF CHICAGO, ILLINOIS.

HEATER.

Application filed October 28, 1922. Serial No. 597,467.

*To all whom it may concern:*

Be it known that I, JEROME BARLOW, a citizen of the United States, and a resident of the city of Chicago, county of Cook, and State of Illinois, have invented certain new and useful Improvements in Heaters, of which the following is a specification.

This invention relates to heaters, and has for its object the provision of a heater, particularly adapted to be connected with a heating plant of any suitable kind to serve as a substitute or auxiliary heat producing agency, together with means for directing a current of air through the heater to facilitate distribution of the heated air throughout the heating plant.

Another object of the invention is to arrange a plurality of electrical heating elements in spaced relation, and in substantial parallelism with a current of air under pressure directed therepast for effectively heating such air together with means for spreading and distributing the air over the heating elements.

Other objects will appear hereinafter.

The invention consists in the combinations and arrangements of parts hereinafter described and claimed.

The invention will be best understood by reference to the accompanying drawings forming a part of this specification, and in which, Fig. 1 is a vertical section of the invention, showing parts thereof in full lines;

Figure 1:
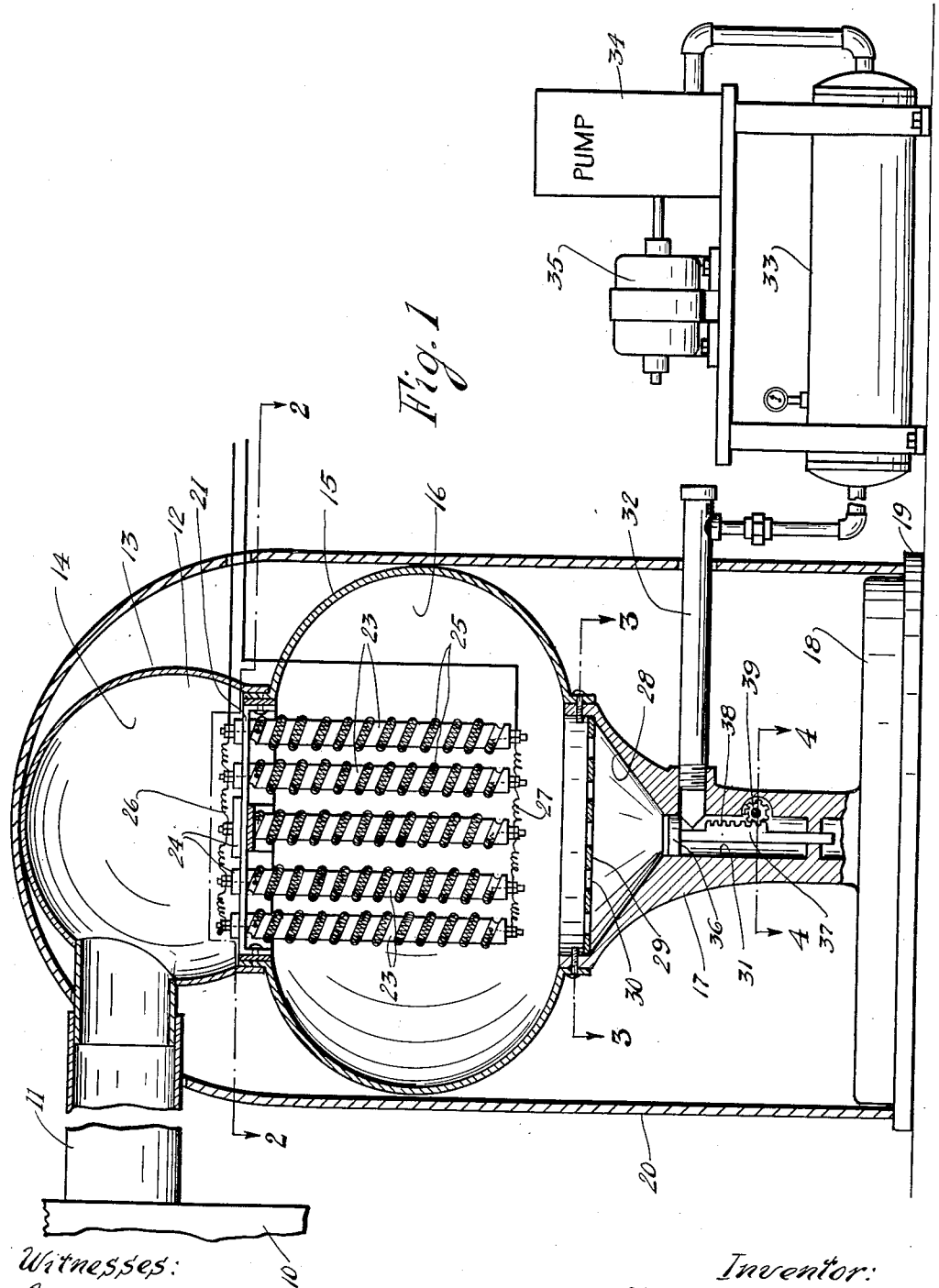
Figure 2:
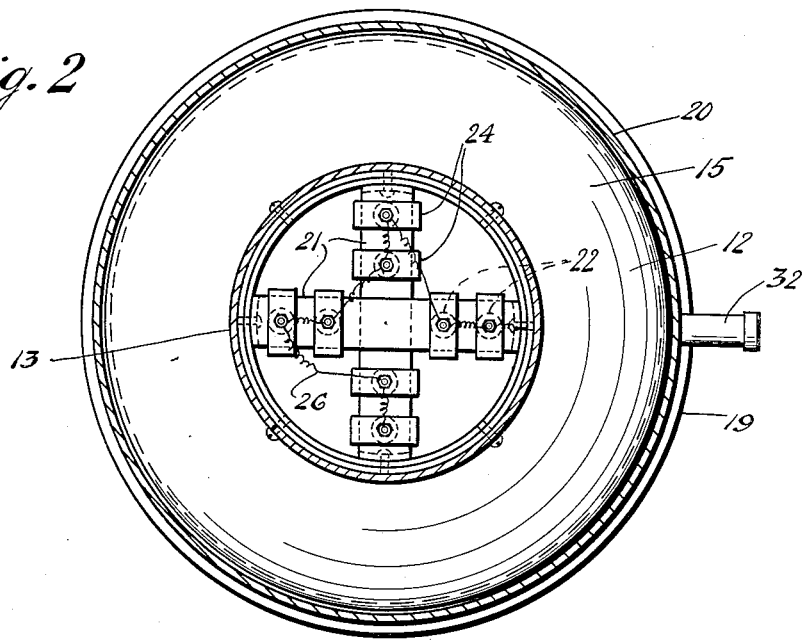
Fig. 2 is a sectional view of the invention, on the line 2—2 of Fig. 1.
Figures 3, 4:
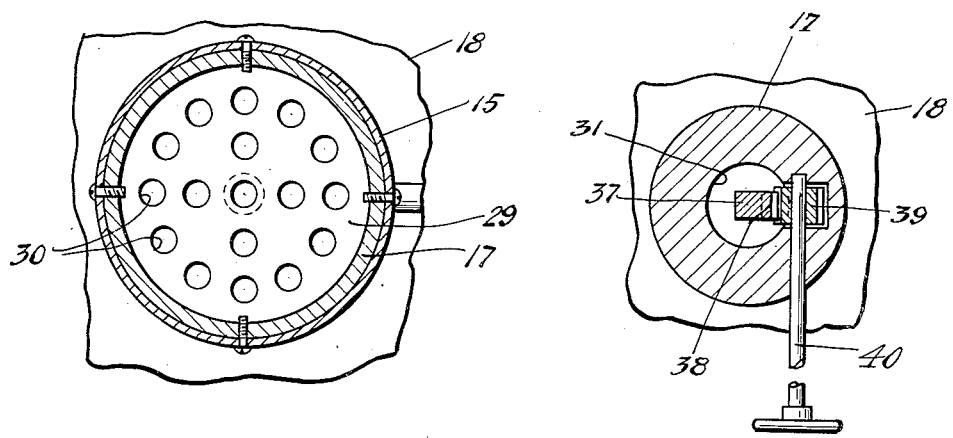
Fig. 3 is a sectional view of the invention on the line 3—3 of Fig. 1.
Fig. 4 is a sectional view of the invention on the line 4—4 of Fig. 1.

The heater contemplated herein is primarily intended as a substitute or auxiliary device intended to be interposed in, or connected with, heat distributing systems of various types of heating plants, and may be connected with the casing of a furnace, with a single flue, if desired, or other suitable portion of the heating plant.

Referring to the drawings, 10 represents a fragment of a furnace casing, though it is obvious that any other suitable portion of the heat distributing system may be utilized, as above explained; and 11 represents a suitable connection which communicates with the interior of a heater 12. The heater 12 preferably comprises a hood 13 having a chamber 14, such hood being preferably detachably mounted upon a somewhat larger body portion 15 having a chamber 16 therein, such body portion being mounted upon a suitable pedestal 17. The pedestal 17 is provided with a base 18 having a flange 19, adapted to support a housing 20, preferably of asbestos, which incloses the heater 12.

Mounted in the upper portion of the chamber 16 is a frame 21, which is preferably in the form of a cross. Such frame may be provided with suitable apertures 22 adapted to accommodate elongated heating elements 23, such heating elements each being provided with a flange 24, adapted to rest upon the frame 21 so as to suspend the heating elements 23 in the chamber 16 as shown. The heating elements 23 each comprises a body of insulating material having coils 25 of resistant wire thereon, said elements preferably being connected in parallel by the wires 26 and 27, such wires extending outwardly through the housing 20 and being connected with a suitable source of current (not shown).

The pedestal 17 is provided with an inverted conical chamber 28, at the mouth of which is mounted a plate 29 having a plurality of spaced perforations 30 therein. The inner end of the chamber 28 communicates with a bore 31, in the pedestal 17, and with a conduit 32, which may be connected to a compressed air tank 33 provided with a suitable pump 34 and motor 35 for driving the same. If desired, instead of the compressed air outfit, an ordinary blower fan (not shown) might be used. The bore 31 may be provided with any suitable valve for regulating the passage of air through the conduit 32 and the heater 12. As shown, a valve 36 is slidably mounted in the bore 31, such valve preferably having a stem 37 upon which is provided a rack 38 engaged by a pinion 39 mounted upon a shaft 40 extending to the outside of the housing 20.

By this arrangement a current of air under pressure is directed through the heater, such current of air being controlled by the valve 36, and spread by the conical chamber 28 and plate 29 so as to pass between and around a plurality of spaced electrical heating elements, and being heated thereby before passing into the heat distributing system of the heating plant.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. The combination, with the heat distributing system of a heating plant; of an auxiliary heating device comprising means for delivering a current of air to said heating system; means for controlling said current of air; and means for heating said air prior to delivery to said heating system, said heating means including a frame with separate elongated heating elements extending therefrom parallel to the direction of flow of said current of air.

2. The combination, with the heat distributing system of a heating plant; of an auxiliary heating device connected with said system, and including a supporting pedestal with an air passage; means for directing a current of air under pressure through said passage and auxiliary heating device and into said heating system; and means in said pedestal for regulating the flow of air through said passage and heating system.

3. The combination, with the heat distributing system of a heating plant; of an auxiliary heating device connected with said heat distributing system, and including a body portion with heating elements therein; a supporting member for said body portion; means for directing air under pressure through said supporting member and body portion and into said heat distributing system; and means in said supporting member for regulating the passage of air through said auxiliary heating device and into said heat distributing system.

4. The combination with the heat distributing system of a heating plant; of an auxiliary heating device connected with said heat distributing system, said heating device having a passage therethrough communicating with said system; electric heating elements mounted in said passage; means for directing compressed air through said passage and into said heat distributing system; and means with a conical chamber and a perforated plate thereon for distributing said air over said heating elements.

5. The combination, with the heat distributing system of a heating plant; of a housing disposed exteriorly of said heat distributing system, and containing an auxiliary heating device connected with said system, said heating device including a body portion having a passage therethrough communicating with said system; a frame mounted in said body portion and having electric heating elements mounted thereon and extending parallel with the flow of air through said passage; means for directing compressed air through said passage and into said heat distributing system; and means for regulating the flow of air through said passage.

6. The combination with the heat distributing system of a heating plant; of an auxiliary heating device connected with said heat distributing system, said heating device having a passage therethrough communicating with said system; electric heating elements mounted in said passage; means for directing compressed air through said passage and into said heat distributing system; means for distributing said air over said heating elements; and means for regulating the flow of air through said passage.

7. The combination with the heat distributing system of a heating plant, of an auxiliary heating device disposed exteriorly of said heating system; said heating device including a body portion; a frame mounted in said body portion having means for supporting a plurality of electric heating elements; a pedestal for supporting said body portion, said pedestal having a chamber therein communicating with said body portion; means for directing air under pressure through said body portion; and a valve mounted in said pedestal for controlling the passage of air through said body portion and into said heat distributing system.

In testimony whereof I have signed my name to this specification in the presence of two subscribing witnesses.

JEROME BARLOW.

Witnesses:
JOSHUA R. H. POTTS,
MARGARET AUER.